US012782054B2

(12) United States Patent
Ferguson et al.

(10) Patent No.: US 12,782,054 B2
(45) Date of Patent: Nov. 3, 2026

(54) SIDEWALL LEAK CONTAINMENT AND DETECTION SYSTEM FOR A FURNACE

(71) Applicant: Systems Spray Cooled LLC, Smyrna, TN (US)

(72) Inventors: Scott A. Ferguson, Murfreesboro, TN (US); Eric Chodl, Smyrna, TN (US)

(73) Assignee: Systems Spray Cooled LLC, Smyrna, TN (US)

(*) Notice: Subject to any disclaimer, the term of this patent is extended or adjusted under 35 U.S.C. 154(b) by 274 days.

(21) Appl. No.: 18/504,036

(22) Filed: Nov. 7, 2023

(65) Prior Publication Data

US 2025/0146752 A1 May 8, 2025

(51) Int. Cl.

| | |
|---|---|
| ***F27B 3/24*** | (2006.01) |
| ***F27B 3/16*** | (2006.01) |
| ***F27B 3/28*** | (2006.01) |
| ***F27D 1/12*** | (2006.01) |
| *F27D 9/00* | (2006.01) |

(52) U.S. Cl.

CPC .................. *F27B 3/16* (2013.01); *F27B 3/24* (2013.01); *F27B 3/28* (2013.01); *F27D 1/12* (2013.01); *F27D 2009/001* (2013.01)

(58) Field of Classification Search

CPC ...... F27B 3/16; F27B 3/24; F27B 3/28; F27B 3/085; F27B 3/183; F27B 2005/064; F27B 2005/068; F27B 13/10; F27D 1/12

See application file for complete search history.

(56) References Cited

U.S. PATENT DOCUMENTS 4,259,539 A * 3/1981 Elsner ..................... F27D 11/08 373/76

5,330,161 A * 7/1994 Lehr ......................... C21C 5/40 266/158

(Continued)

FOREIGN PATENT DOCUMENTS

| | | |
|---|---|---|
| CN | 201293542 Y | 8/2009 |
| JP | H10153386 A | 6/1998 |

(Continued)

OTHER PUBLICATIONS

Office Action from United Arab Emirates Application No. P2024-01030 dated Dec. 30, 2025.

(Continued)

*Primary Examiner* — Gregory A Wilson

(74) *Attorney, Agent, or Firm* — Patterson + Sheridan, LLP

(57) ABSTRACT

A sidewall suitable for use in a metallurgical furnace is provided. The sidewall has an upper wall, and an outer wall is coupled to the upper wall and extends downward from the upper wall. An inner wall is coupled to the upper wall and extends downward from the upper wall. The inner wall has an inner surface facing and circumscribed by the outer wall. A bottom wall is coupled to the inner wall. The bottom wall has a bottom extension wall extending away from the inner wall. A liner wall is attached to the bottom extension wall and extends upward in a spaced apart relationship to the inner wall. A spray cooling assembly is disposed between the inner wall and the outer wall. The spray cooling assembly is configured to spray coolant on the inner surface of the inner wall.

20 Claims, 11 Drawing Sheets

(56) References Cited

U.S. PATENT DOCUMENTS

| | | | | | |
|---|---|---|---|---|---|
| 5,561,685 | A * | 10/1996 | Lehr | F27D 1/12 373/76 |
| 10,767,931 | B2 * | 9/2020 | Ferguson | F27B 3/10 |
| 11,946,697 | B2 * | 4/2024 | Ferguson | F23C 5/02 |
| 12,078,418 | B2 * | 9/2024 | Ferguson | F27D 1/04 |
| 2006/0091590 | A1 | 5/2006 | Arthur et al. | |
| 2009/0148800 | A1 | 6/2009 | Valentas et al. | |
| 2010/0044935 | A1 | 2/2010 | Medina | |
| 2015/0084246 | A1 | 3/2015 | Tang et al. | |
| 2022/0003498 | A1 * | 1/2022 | Ferguson | B05B 1/20 |

FOREIGN PATENT DOCUMENTS

| | | |
|---|---|---|
| JP | H11201651 A | 7/1999 |
| KR | 20200004321 A | 1/2020 |

OTHER PUBLICATIONS

International Search Report and Written Opinion for PCT/US2024/054595 dated Feb. 18, 2025.
Mexican Office Action for Application No. MX/a/2026/004535 dated May 14, 2026.
Office Action from Mexican Patent Application No. MX/a/2026/004535, dated Jul. 28, 2026.

* cited by examiner

SIDEWALL LEAK CONTAINMENT AND DETECTION SYSTEM FOR A FURNACE

BACKGROUND

Field of Endeavor

Embodiments of the present disclosure relates generally to a leak containment feature for a sidewall for a metallurgical furnace, and a metallurgical furnace having the same. Embodiments of the present disclosure also relates generally to a leak and/or temperature monitoring system for a metallurgical furnace.

Description of the Related Art

Metallurgical furnaces, such as an electric arc furnace or a ladle metallurgical furnace, are used in the processing of molten materials. A metallurgical furnace has a number of components, including a roof that is retractable, a hearth that is lined with refractory brick, and a sidewall that sits on top of the hearth. The roof can be retracted in order to supply the furnace with metal, which is melted, thereby creating molten materials, and byproducts, such as slag.

For metallurgical furnaces that utilize one or more electrodes as a heating source, an electric arc is generated and sustained by the electrode(s) to form the molten materials. As the refractory brick lining the hearth is exposed below the furnace sidewall, metal loaded into the metallurgical furnace often contacts and damages the refractory brick. Damaged refractory brick may allow the underlying metal material comprising the metallurgical furnace to become damaged, consequently requiring the metallurgical furnace to be taken out of service for repair.

Metallurgical furnaces are typically equipped with a cooling system for reducing a temperature of the sidewall. The cooling system may use a liquid, such as water, to cool the sidewall. However, it may be possible for a leakage to occur. In the event of a leak, contact of the leaking liquid with the molten metal in the furnace may cause an explosion.

There is, therefore, a need for an improved sidewall for a metallurgical furnace. There is also a need for leak and/or temperature monitoring system for a metallurgical furnace.

SUMMARY

Described herein is a sidewall suitable for use in a metallurgical furnace, and metallurgical furnace having the same. In one example, the sidewall has an upper wall, and an outer wall is coupled to the upper wall and extends downward from the upper wall. An inner wall is coupled to the upper wall and extends downward from the upper wall. The inner wall has an inner surface facing and circumscribed by the outer wall. A bottom wall is coupled to the inner wall. The bottom wall has a bottom extension wall extending away from the inner wall. A liner wall is attached to the bottom extension wall and extends upward in a spaced apart relationship to the inner wall. A spray cooling assembly is disposed between the inner wall and the outer wall. The spray cooling assembly is configured to spray coolant on the inner surface of the inner wall.

In another example, a metallurgical furnace is provided. The metallurgical furnace includes a hearth and a plurality of refractory bricks lining a portion of the hearth. A sidewall is disposed on the hearth. The sidewall has an upper wall, and an outer wall is coupled to the upper wall and extends downward from the upper wall. An inner wall is coupled to the upper wall and extends downward from the upper wall. The inner wall has an inner surface facing and circumscribed by the outer wall. A bottom wall is coupled to the inner wall. The bottom wall has a bottom extension wall extending away from the inner wall. A liner wall is attached to the bottom extension wall and extends upward in a spaced apart relationship to the inner wall. A spray cooling assembly is disposed between the inner wall and the outer wall. The spray cooling assembly is configured to spray coolant on the inner surface of the inner wall.

In some examples, a method for monitoring operation of a metallurgical furnace is provided. The method includes disposing a sidewall on a hearth of the furnace. The sidewall includes an upper wall, an outer wall coupled to the upper wall and extending downward from the upper wall, and an inner wall coupled to the upper wall, the inner wall extending downward from the upper wall. The inner wall has an inner surface facing and circumscribed by the outer wall. The sidewall also includes a bottom wall coupled to the inner wall. The bottom wall has a bottom extension wall extending away from the inner wall. A liner wall is attached to the bottom extension wall and extending upward in a spaced apart relationship to the inner wall. The liner wall is disposed along a portion a plurality of refractory bricks lining the hearth. The method also includes spraying coolant on the inner surface of the inner wall. The method further includes detecting a moisture on the bottom wall of the sidewall and identifying a location of the detected moisture.

BRIEF DESCRIPTION OF THE DRAWINGS

So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appending drawings admit to other equally effective examples.

In order to facilitate understanding, identical reference numerals have been used, where possible, to designate identical elements that are common features. It is contemplated that elements and features of one example may be beneficially incorporated into other examples without further recitation.

DETAILED DESCRIPTION

A metallurgical furnace includes a roof, one or more electrodes, a hearth lined with refractory bricks, and a sidewall supported by the hearth. The sidewall includes a bottom wall that has a bottom extension wall that extends inward toward the refractory bricks. A liner wall is attached to the end of the bottom extension wall and extend upward away from the hearth. Some of the refractory bricks may extend above the hearth and line the radially inward side of the liner wall. The liner wall functions to space refractory bricks from the main portions of the sidewall, thus reducing thermal loads on the sidewall. The sidewall includes a leak containment feature configured to capture water that may escape through the inner wall should the inner wall be compromised. The leak containment feature may be a catch basin defined by the liner wall, the bottom extension wall, and an inner wall of the sidewall. The catch basin prevents water from reaching the refractory bricks and compromising the refractory bricks. In addition, the catch basin prevents water from reaching the molten material disposed in the hearth and becoming a hazard. A plurality of apertures are formed through the inner wall within the catch basin at or near the bottom extension wall to allow any water present in the catch basin to drain away from the interior of the furnace and under the drain trough where the water can be safely removed. In some examples, one or more moisture sensors are positioned adjacent apertures for detecting the presence of water, which is an indicator of a water leak through the inner wall. The liner wall also includes a port for humidity and temperature sensors that enable temperature and humidity monitoring of the refractory bricks. The humidity and temperature information may be utilized to determine the condition and trends in the condition of the refractory bricks, which can be used to improve preventative maintenance scheduling and to flag potential furnace conditions that require an operator's attention.

Figure 1:
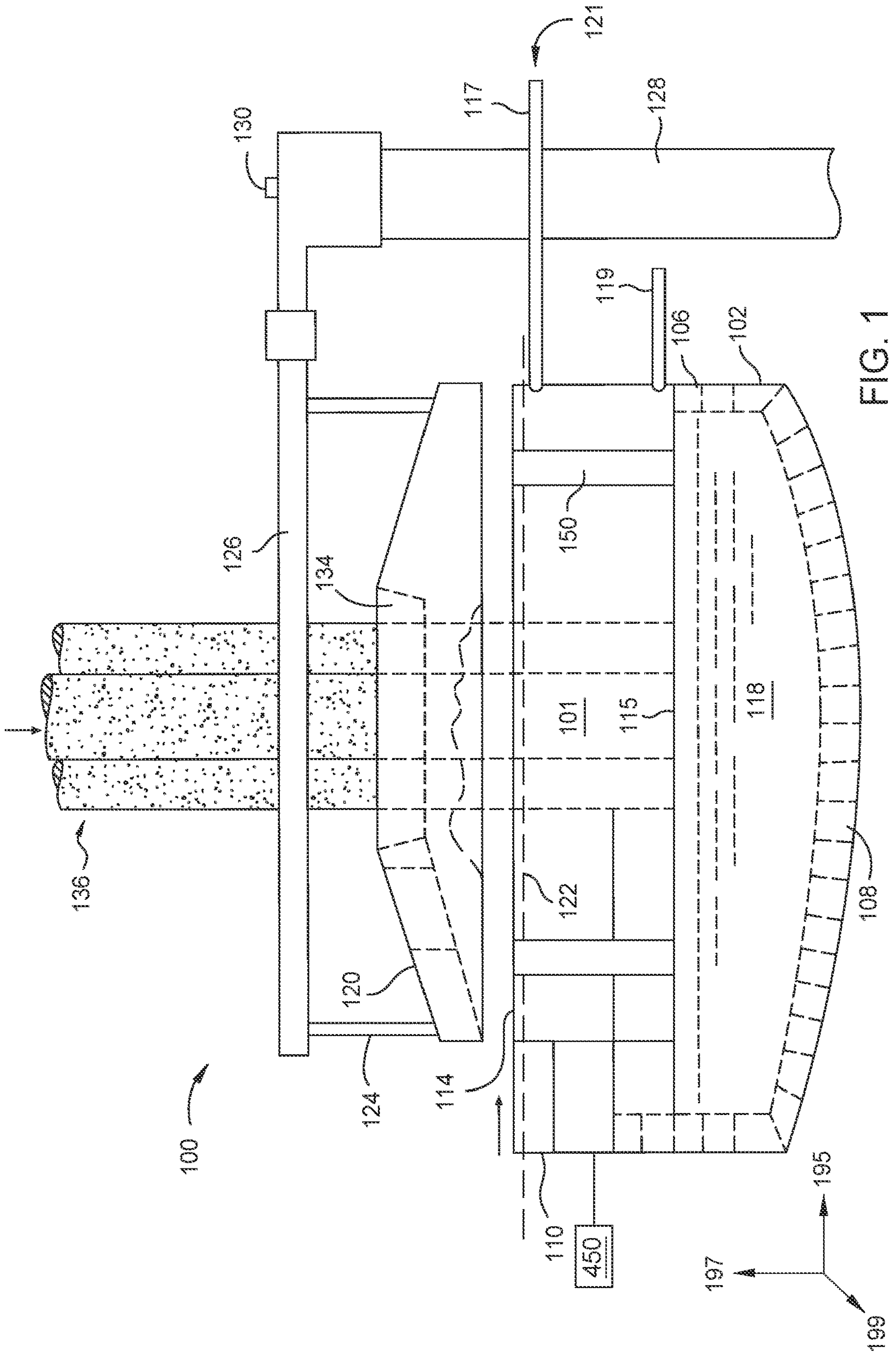
FIG. 1 illustrates a side view of a metallurgical furnace having a sidewall disposed on a hearth.

FIG. 1 shows a side view of the metallurgical furnace having a body 102 and a roof 120. In FIG. 1, an x-direction 195 is shown perpendicular to a y-direction 197. A z-direction 199 is depicted orthogonal to the x-direction 195 and orthogonal to the y-direction 197.

The body 102 depicted in FIG. 1 includes sidewall 110 disposed on a hearth 106. The body 102 may be generally cylindrical in shape and have an elliptical bottom.

The hearth 106 is lined with refractory bricks 108. The sidewall 110 has an upper wall 114 and a bottom wall 115. The roof 120 is moveably disposed on the upper wall 114 of the sidewall 110. The bottom wall 115 of the sidewall 110 is removably disposed on the hearth 106.

A cooling system 121 is utilized to control the temperature of sidewall 110. The cooling system 121 has an input cooling port 117 for introducing coolant into the sidewall 110. The cooling system 121 also has a drain port 119 that empties spent coolant from the sidewall 110. Additional details of the cooling system 121 are discussed below.

The metallurgical furnace 100, including the body 102 and the roof 120, is rotatable along a tilt axis 122 about which the metallurgical furnace 100 can tilt. The metallurgical furnace 100 may be tilted in a first direction about the tilt axis 122 toward a door multiple times during a single batch melting process, sometimes referred to as a "heat", in order to remove slag. Similarly, the metallurgical furnace 100 may be tilted in a second direction about the tilt axis 122 towards a tap spout (not shown) multiple times during a single batch melting process to remove a molten material 118 disposed in the internal region of the metallurgical furnace 100 surrounded by the refractory bricks 108.

Roof lift members 124 may be attached at a first end to the roof 120. The roof lift members 124 may be chains, cables, rigid supports, or other suitable mechanisms for supporting the roof 120. The roof lift members 124 may be attached at a second end to one or more mast arms 126. The mast arms 126 extend horizontally, spreading outwards from a mast support 128. The mast support 128 is supported by a mast post 130. The mast support 128 can rotate about the mast post 130. Alternately, the mast post 130 may rotate with the mast support 128 in order to move the roof lift members 124. In another example, roof lift members 124 may be aerially supported to move the roof 120. In an alternative example, the roof 120 is configured to swing or lift away from the sidewall 110. The roof 120 is lifted away from the sidewall 110 to expose an opening 101, i.e. an interior volume of the metallurgical furnace 100 through the upper wall 114 of the sidewall 110 for loading material therein.

The roof 120 may be circular in shape. In at least one example, the roof 120 is spray-cooled utilizing the cooling system 121 or other suitable temperature control mechanism. A central opening 134 may be formed through the roof 120. One or more electrode(s) 136 extend through the central opening 134 from a position above the roof 120 into the opening 101. During operation of the metallurgical furnace 100, the electrode(s) 136 are lowered through the central opening 134 into the opening 101 of the metallurgical furnace 100 to provide electric arc-generated heat to melt metal, producing the molten material 118. In one example, the roof 120 includes an exhaust port (not shown) to remove fumes generated within the metallurgical furnace 100.

Figure 2:
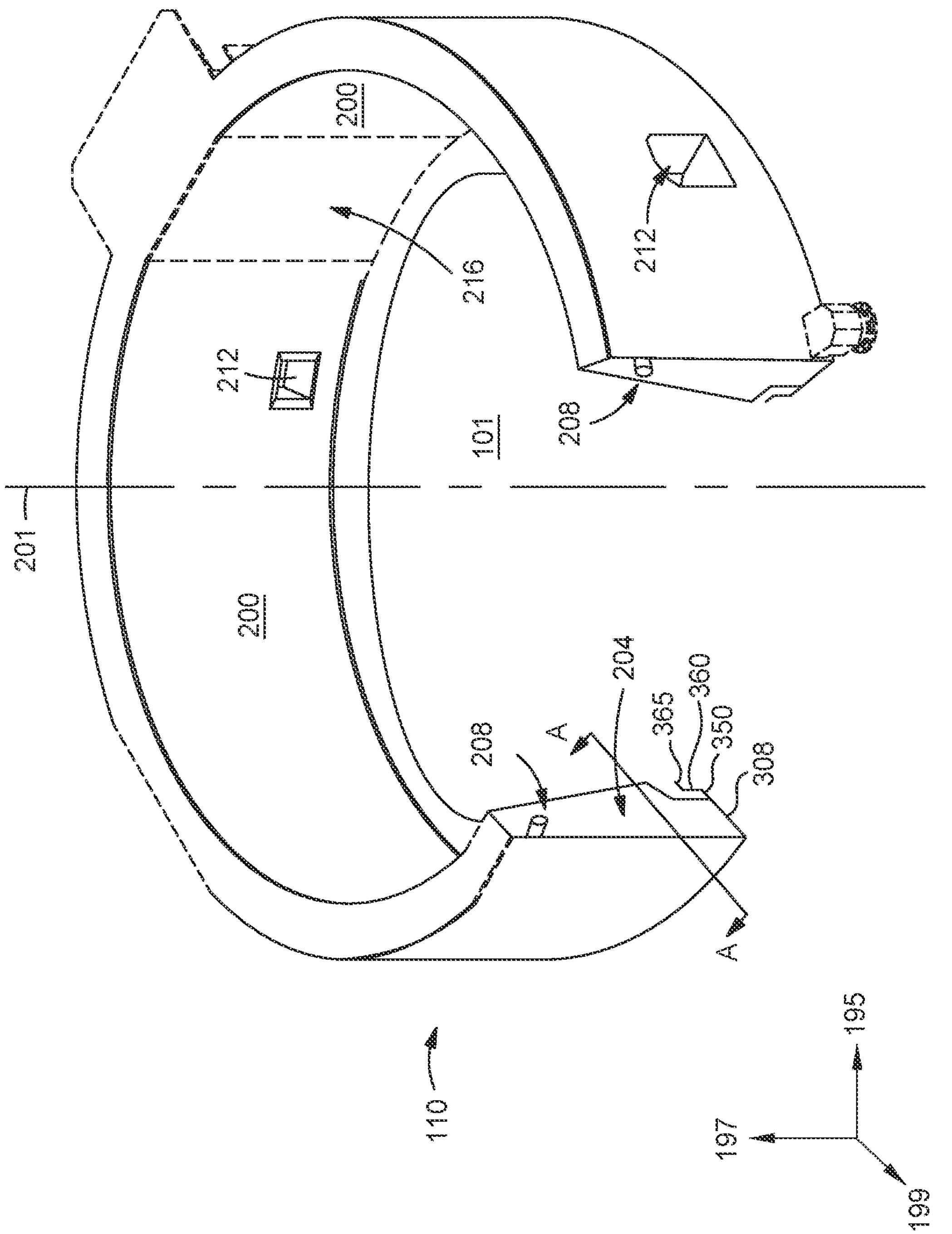
FIG. 2 is an isometric view of the sidewall shown in FIG. 1 having a partial cutaway.

FIG. 2 is an isometric view of the sidewall 110 shown in FIG. 1 having a portion of the sidewall 110 cutaway. The sidewall 110 is shown radially disposed in the z-direction 199 about a centerline 201. The centerline 201 is parallel to the y-direction 197, and the centerline 201 is the radial center the opening 101. When the sidewall 110 is installed on the hearth 106 of the metallurgical furnace 100, the opening 101 provides a passage for which metal, scrap metal, or other meltable material to enter the metallurgical furnace 100 to be melted.

The sidewall 110 has an internal space 204 in which a spray cooling assembly 208 is disposed. The spray cooling assembly 208 is part of the cooling system 121 utilized to control the temperature of the sidewall 110 when the metallurgical furnace 100 is in operation. The spray cooling assembly 208, discussed in detail below, can include one or more parts that are concentrically disposed within the internal space 204 of the sidewall 110. The spray cooling assembly 208 is configured to flow a coolant, such as water provided from the cooling system 121, onto the cool face of the sloped sidewall. The coolant is not limited to water or water-based liquids, and may be an aqueous liquid, foam, or non-aqueous cooling liquid. When the sidewall 110 is disposed on the hearth 106 of the metallurgical furnace 100, the spray cooling assembly 208 is connected to the input cooling port 117 for introducing coolant into the internal space 204.

In one example, the sidewall 110 of the metallurgical furnace 100 may include one or more apertures 212. The apertures 212 extend through the sidewall 110, thus providing physical access to the opening 101. In one example, the aperture 212 may be utilized to provide access to the opening 101 for a burner nozzle.

In another example, the sidewall 110 includes one or more doors 216. The doors 216 may be utilized to remove slag and to remove the molten material 118 in the manner discussed above.

Figure 3:
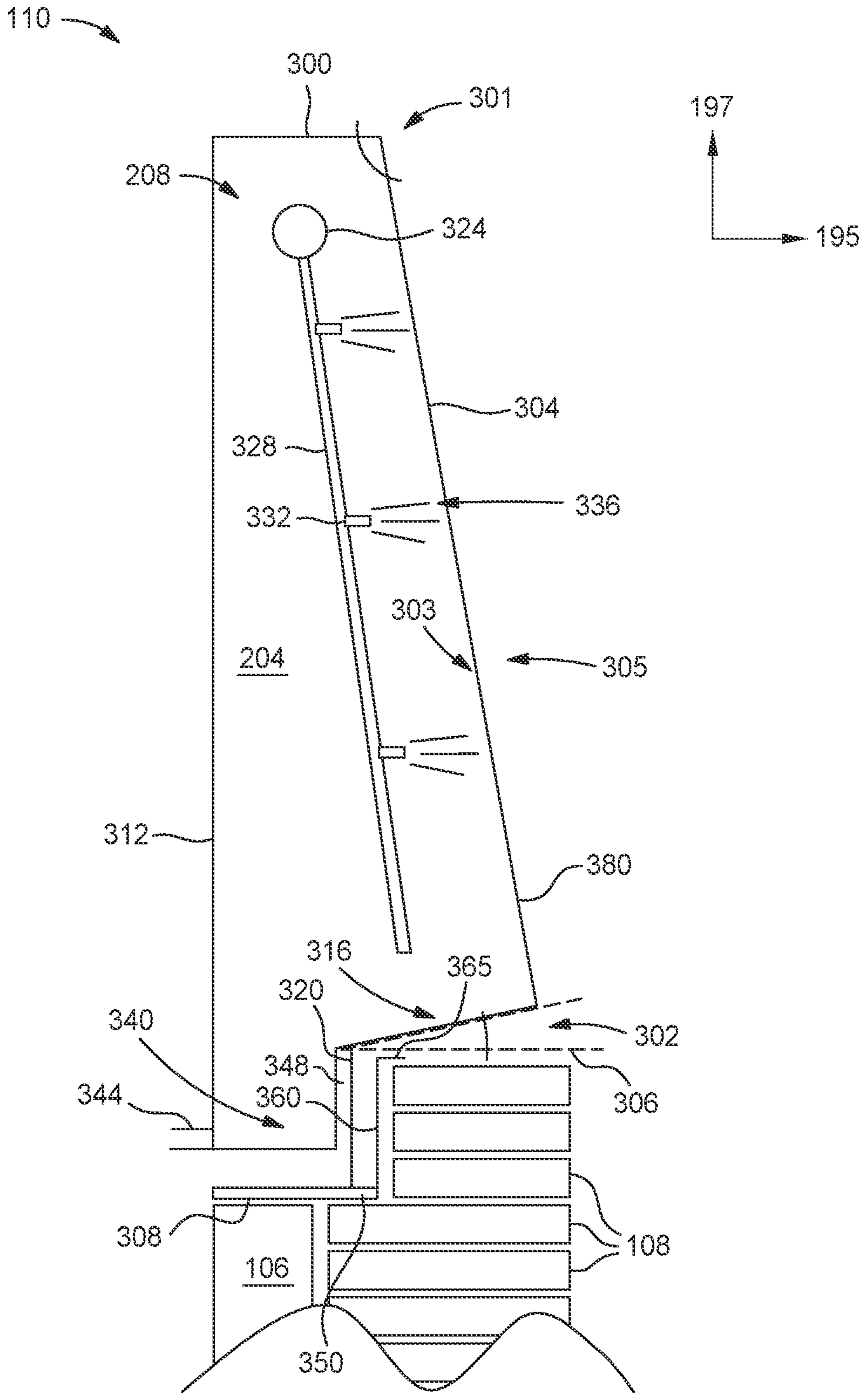
FIG. 3 is a sectional view of one example of the sidewall shown disposed on the hearth taken along section line A-A of FIG. 2.
Figure 4:
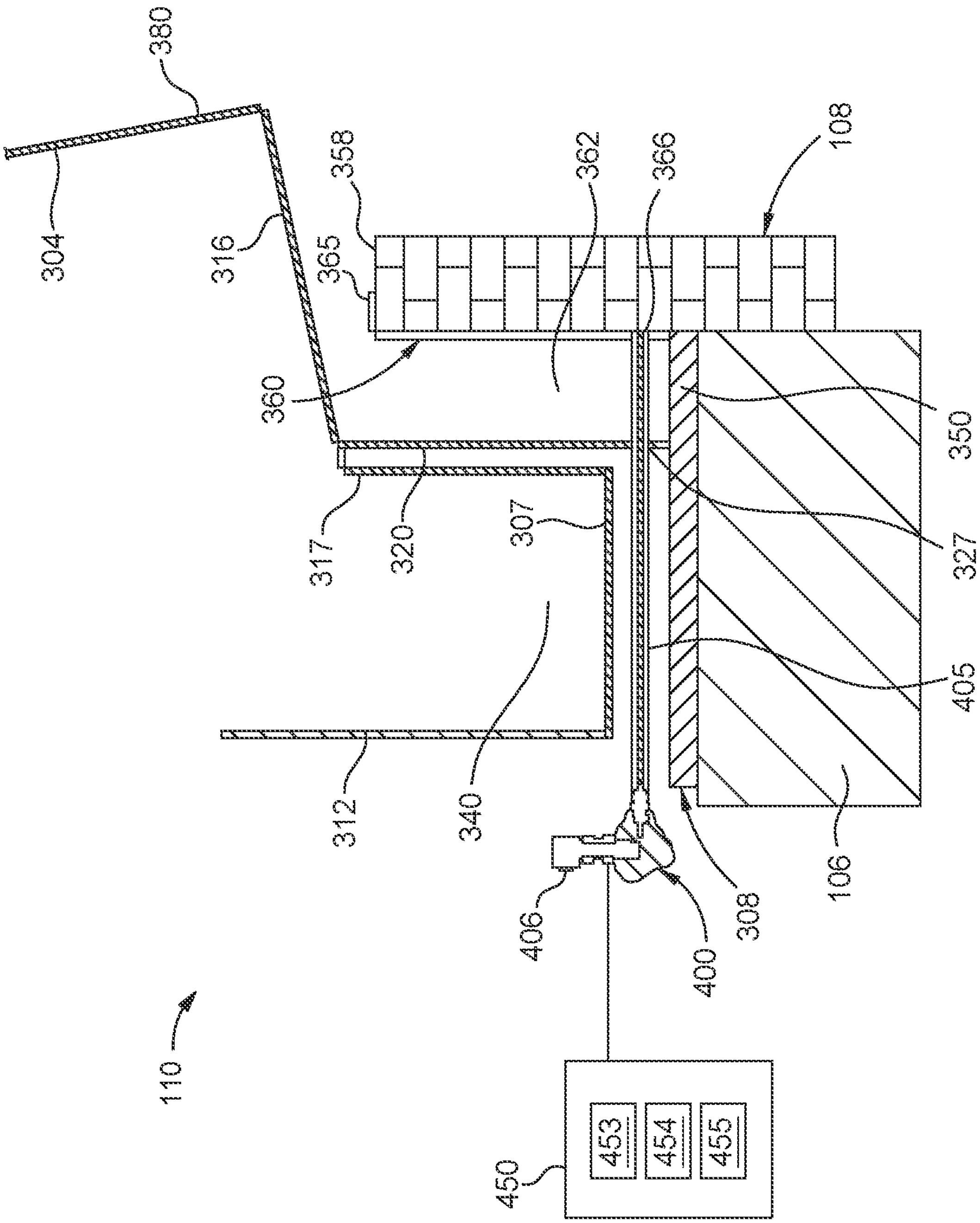
FIG. 4 is another partial sectional view of the sidewall of FIG. 3 shown disposed on the hearth.

FIG. 3 show an exemplary configuration of the sidewall 110. The sidewall 110 is shown in a sectional view taken along section line A-A depicted in FIG. 2. FIG. 4 is an enlarged, partial view of the sidewall 110. The sidewall 110 includes an upper wall 300, an inner wall 304, a bottom wall 308, and an outer wall 312. The inner wall 304 of the sidewall 110 also includes an upper sloped wall 380, a return wall 316 and a lower wall 320. The return wall 316 and the lower wall 320 connect the upper sloped wall 380 to the bottom wall 308 in a manner that forms a leak containment feature under the upper sloped wall 380. In one example, the leak containment feature is a catch basin 362. The catch basin 362 retains water that may be flowing down the furnace side of the inner wall 304 should the inner wall 304 become compromised, such as being pierced by a piece of scrap steel. An inner surface 303 (e.g., cool face) of the inner wall 304 faces the internal space 204. An outer surface 305 (e.g., hot face) of the inner wall 304 is opposite the inner surface 303 and faces the electrodes 136 disposed in the interior of the furnace 100. As such, the outer surface 305 of the inner wall 304 faces the opening 101. As previously noted, the centerline 201 is the center of the opening 101.

The upper sloped wall 380 of the inner wall 304 extends inward and downward from the upper wall 300 at a first angle 301. The first angle 301 of the sidewall 110 is formed between the inner surface 303 of the upper wall 300 and the inner surface 303 of the upper sloped wall 380. A second angle 302 is formed between the return wall 316 and an imaginary line 306. The imaginary line 306 extends perpendicular to the centerline 201, along the x-direction 195. The imaginary line 306 is also parallel to the bottom wall 308. The first angle 301 is greater than 90 degrees and less than about 145 degrees. The second angle 302 is greater than or equal to zero degrees, for example between zero and 45 degrees. In one example, the first angle 301 is between about 95 degrees and 115 degrees. In another example, the first angle 301 is between about 120 degrees and 135 degrees. In an alternative example, the first angle 301 is 130 degrees. The second angle 302 is between about 15 degrees and 25 degrees, in one example. Alternatively, the second angle 302 is between about 30 degrees and 40 degrees. The second angle 302 may be about 45 degrees.

In another example, the second angle 302 can be proportionate to the height of the outer wall 312. For example, as the height of the outer wall 312 increases, a magnitude of the second angle 302 may decrease. As such, the second angle 302 can increase as the height of the outer wall decreases.

The spray cooling assembly 208 shown in FIG. 2 is illustrated in additional detail in FIG. 3. The spray cooling assembly 208 includes a header pipe 324, a plurality of branch conduits 328 coupled to the header pipe 324, and an array of spray nozzles 332 coupled to the branch conduits 328. The header pipe 324 is coupled to the input cooling port 117. The header pipe 324 is generally located at or near the upper wall 300 within the internal space 204. The branch conduits 328 extend downward from the header pipe 324. In one example, the branch conduits 328 extend downward in a non-vertical orientation from the header pipe 324 such that the distal end of the branch conduits 328 is farther from the outer wall 312 than the end of the branch conduit 328 that is coupled to the header pipe 324. Advantageously, the non-vertical orientation of the branch conduit 328 provides more space for servicing within the internal space 204. In this example, the branch conduit 328 maintains a substantially constant distance from the sloped wall 380. Although only one branch conduit 328 is shown in the sectional view of FIG. 3, but it is to be appreciated that the branch conduit 328 are distributed around the internal space 204 such that coolant may be supplied to essentially the entire cool face of the upper sloped wall 380, and optionally, other portions of the inner wall 304.

Each nozzle 332 is coupled to the branch conduit 328. A cooling fluid 336 is sprayed from the nozzles 332 onto the inner surface 303 of the upper sloped wall 380. The cooling fluid 336 is one example of the coolant introduced into the internal space 204 through the input cooling port 117, shown in FIG. 1.

In one exemplary configuration of the sidewall 110, the branch conduit 328 is disposed at the first angle 301 relative to the upper wall 300. Stated differently, the branch conduit 328 is substantially parallel to the inner surface 303 of the upper sloped wall 380.

In each of the configurations disclosed herein, nozzles 332 are arranged to spray cooling fluid 336 onto the inner surface 303 of the upper sloped wall 380. Cooling fluid sprayed on the inner surface 303 runs down the inner surface 303 to the return wall 316, from which the spent coolant is directed to a drain trough 340 extending below the end of the return wall 316. The drain trough 340 includes a trough bottom 307 connecting a trough wall 317 to the outer wall 312. A portion of the outer wall 312 forms part of the drain trough 340. The drain trough 340 is located above the bottom wall 308 and generally encircles the return wall 316. As the coolant runs down the inner surface 303, gravity and surface tension interact to cause droplets to fall from the inclined inner surface 303 such that a sheet of coolant flow leaving the inner surface 303 is not formed, thus allowance coolant sprayed from the nozzles 332 closer to the bottom wall 308 to more effectively reach the inner surface 303 without being blocked by a sheet of coolant flow.

The internal space 204 is sufficiently voluminous to enable maintenance personnel to access the inner surface 303 from inside the sidewall 110. Advantageously, the sidewall 110 enables inspection and maintenance of the spray cooling assembly 208 to be simplified, enabling personnel to perform routine maintenance from within the sidewall 110 without the limited visibility of restrictive maintenance hatches, or the need to disassemble the sidewall 110 to inspect internal components.

The inner surface of the return wall 316 extends beyond the lower wall 320 to the drain trough 340. Cooling fluid 336 flows from the inner surface 303 of the sloped wall 380 to the return wall 316 and into the drain trough 340. The drain trough 340 may include a channel 344 that is coupled to the drain port 119 of the cooling system 121. The channel 344 provides a path for the cooling fluid 336 to flow out from the drain trough 340 of the sidewall 110 and into the drain port 119 so that spent coolant may be removed from the sidewall 110.

A first gap 348 is defined between the lower wall 320 and the drain trough 340. The first gap 348 isolates the cooling fluid 336 disposed in the drain trough 340 from the lower wall 320. Thus, should the lower wall 320 become pierced, fluid within the sidewall 110 or drain trough 340 cannot leak into the interior of the metallurgical furnace 100 and contact the molten material 118 in the hearth 106.

Figure 5:
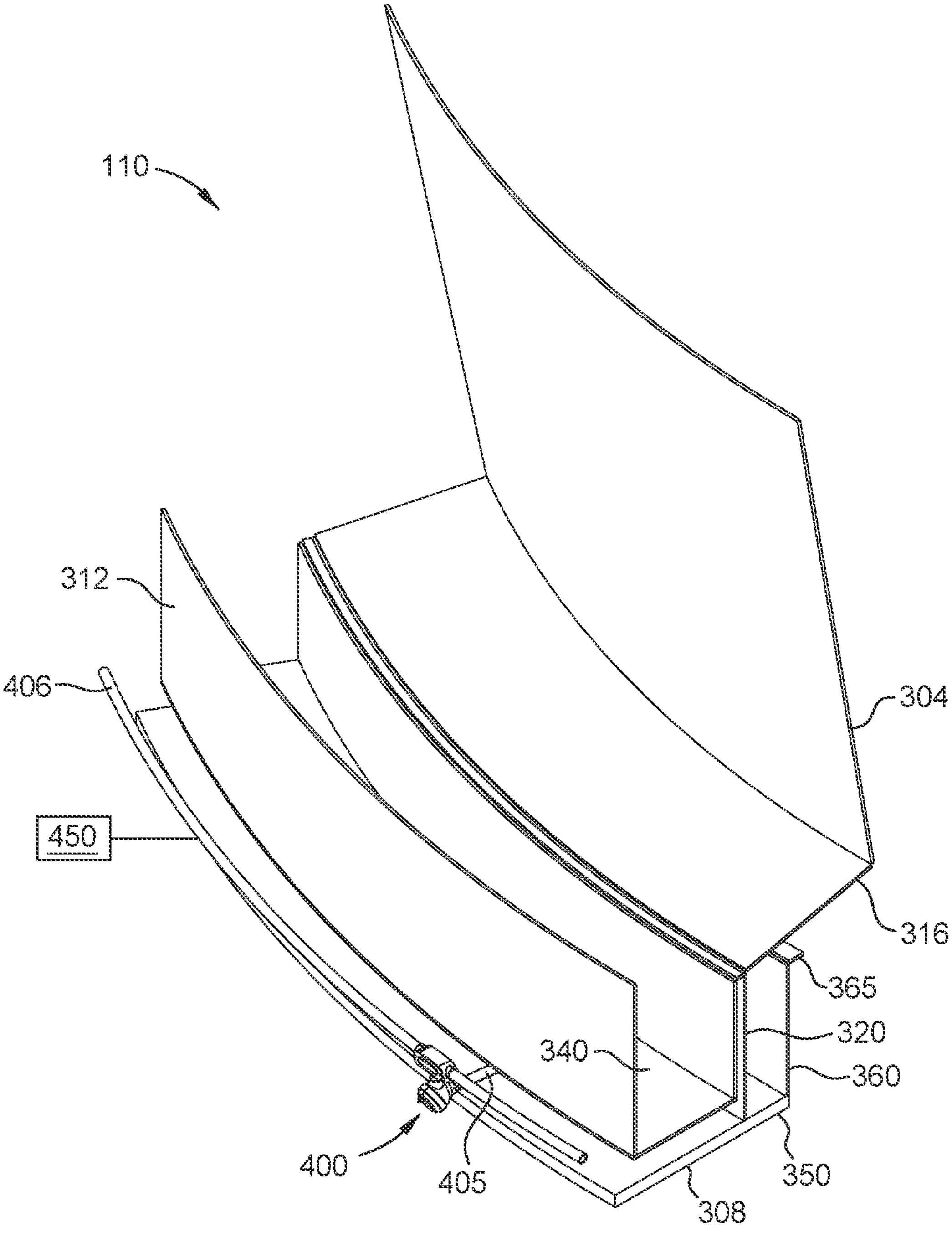
FIG. 5 is a partial sectional isometric, right front interior view of the sidewall of FIG. 3.

In the example shown in FIG. 3, the bottom wall 308 includes a bottom extension wall 350 extending inwardly towards the refractory bricks 108. FIG. 4 is an enlarged, partial view of the sidewall 110. FIG. 5 is a partial, isometric, right front view of the sidewall 110. For sake of clarity, only a lower portion of the outer wall 312 is shown in FIGS. 4 and 5. As shown, the bottom extension wall 350 is integral with the bottom wall 308. In another embodiment, the bottom extension wall 350 may be attached to the bottom wall 308 or to the lower wall 320.

A liner wall 360 is attached to the distal end of the bottom extension wall 350 and extends upward from the bottom extension wall 350 away from the hearth 106. In one example, the refractory bricks 108 are positioned vertically along the furnace facing side of the liner wall 360. In some examples, the liner wall 360 is flush with the backside of the refractory bricks 108 that line the hearth 106. In one example, the liner wall 360 has a height from 6 inches to 20 inches, such as from 10 inches to 18 inches. The refractory bricks 108 may extend from the hearth 106 to the top of the liner wall 360.

In some embodiments, the liner wall 360 includes a cover wall 365 that extends radially inward away from the inner wall 304, covering at least a portion of the top surface 358 of the refractory bricks 108. As shown, the cover wall 365 covers a portion of the top surface 358 of the refractory bricks 108. In some examples, the cover wall 365 may extend across the entire top surface 358 of the refractory bricks 108. The liner wall 360 advantageously acts as a barrier that spaces the refractory bricks 108 from the other portions of the sidewall 110, such as the lower wall 320, thus helping to reduce the heat load transferred from the refractory bricks 108 to the sidewall 110. In some embodiments, the liner wall 360 and the cover wall 365 are made of steel. A leak containment feature such as a catch basin 362 is formed between the liner wall 360, the lower wall 320, and the bottom extension wall 350. The catch basin 362 retains water that may be flowing down the furnace side of the inner wall 304 should the inner wall 304 become compromised.

Figure 6:
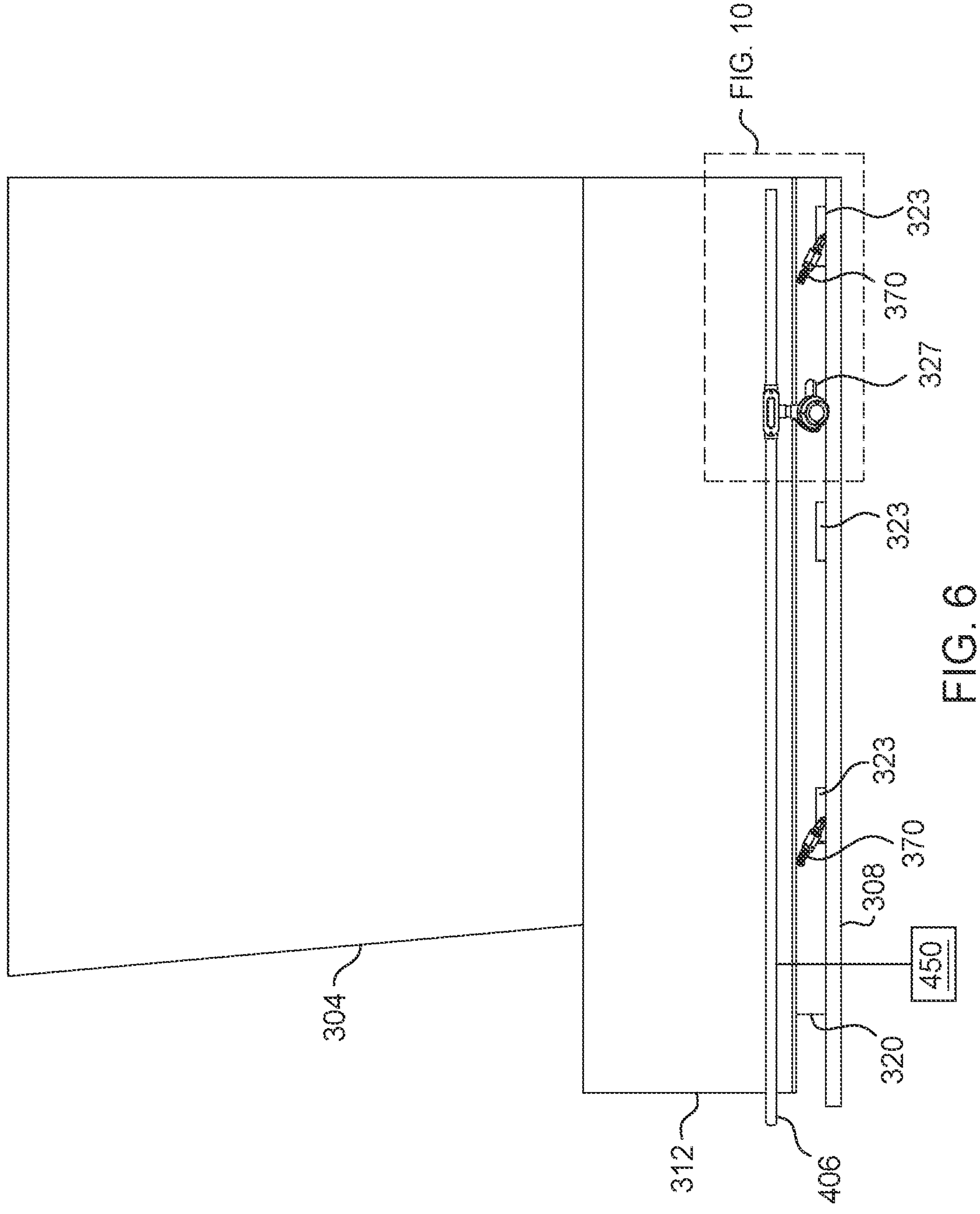
FIG. 6 is a partial sectional front view of a lower interior portion of the sidewall of FIG. 3.

Referring to FIG. 6, a plurality of apertures 323 are formed through the bottom of the inner wall 304, such as the lower wall 320. FIG. 6 is a partial front view of the sidewall 110 with only a lower portion of the outer wall 312 shown for clarity. The apertures 323 may be bounded in part by the bottom wall 308. The plurality of apertures 323 are behind and covered by the liner wall 360, and open to the catch basin 362. The apertures 323 provide a flow path for leaked water that may be present in the catch basin 362 defined between the lower wall 320 and the liner wall 360 to flow under the drain trough 340 and safely away from the interior of the furnace. The plurality of apertures 323 may be circumferentially spaced around the inner wall 304. The apertures 323 may have any suitable shape, such as rectangular or arcuate. In this example, the apertures 323 are slots. The apertures 323 may have any suitable size. In some examples, the ratio of the width to the height may range from 15:1 to 1:5, such as from 10:1. In some examples, the apertures 323 may have a width from 2 inches to 10 inches. The inner wall 304 may include any suitable number of apertures 323, such as from 1 to 50 apertures.

Figure 8:
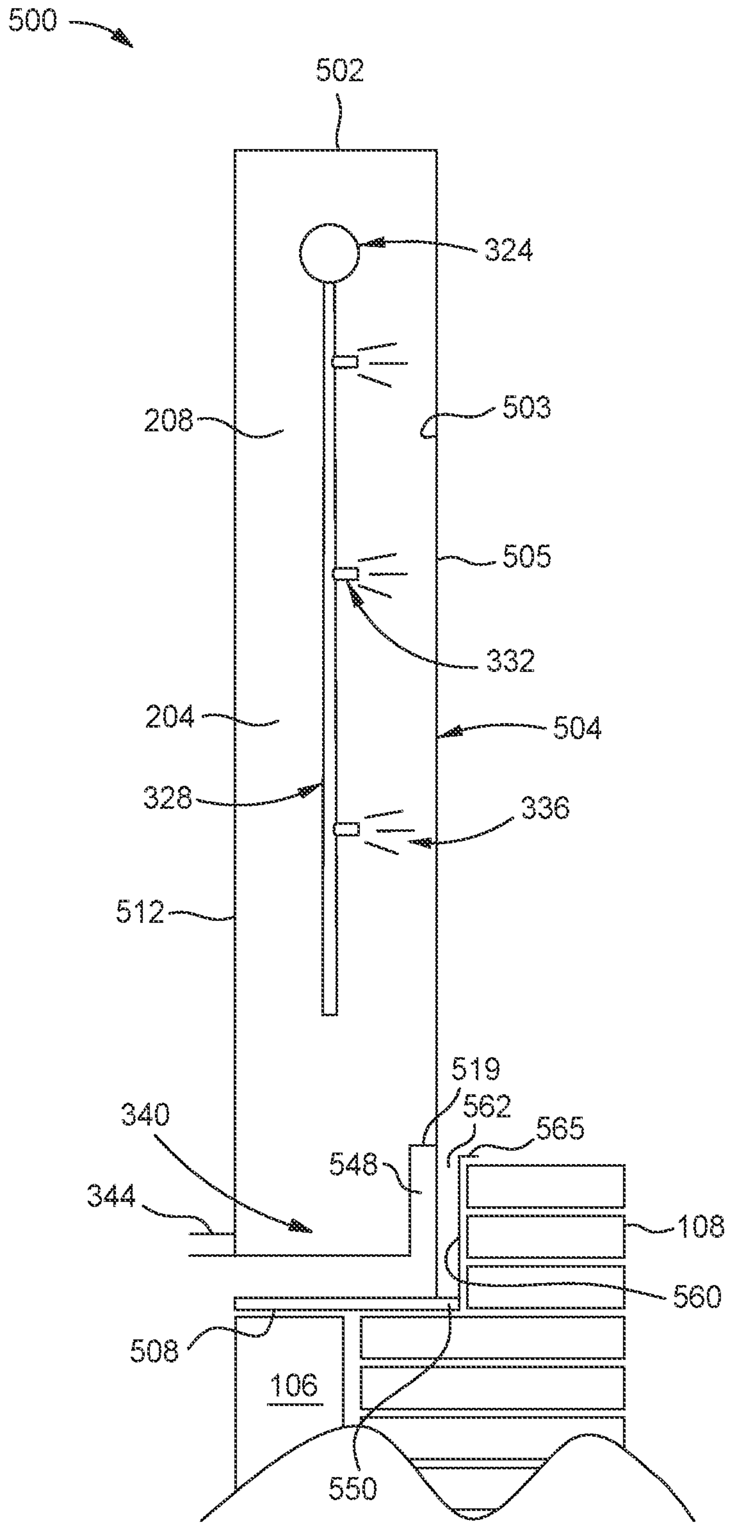
FIG. 8 illustrates another example of a sidewall suitable for use with the furnace of FIG. 1.
Figure 9:
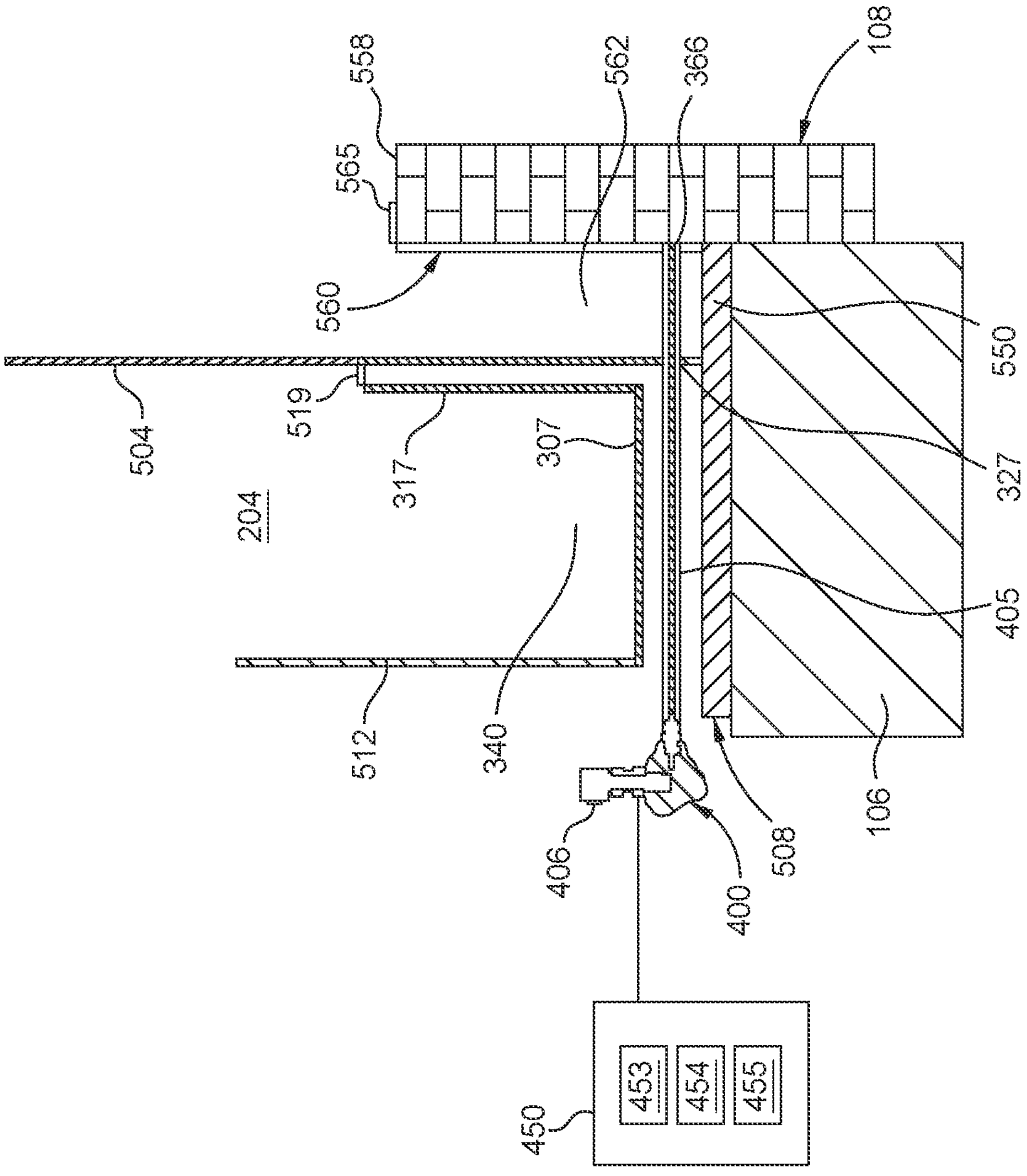
FIG. 9 is another partial sectional view of the sidewall of FIG. 8 shown disposed on the hearth.
Figure 10:
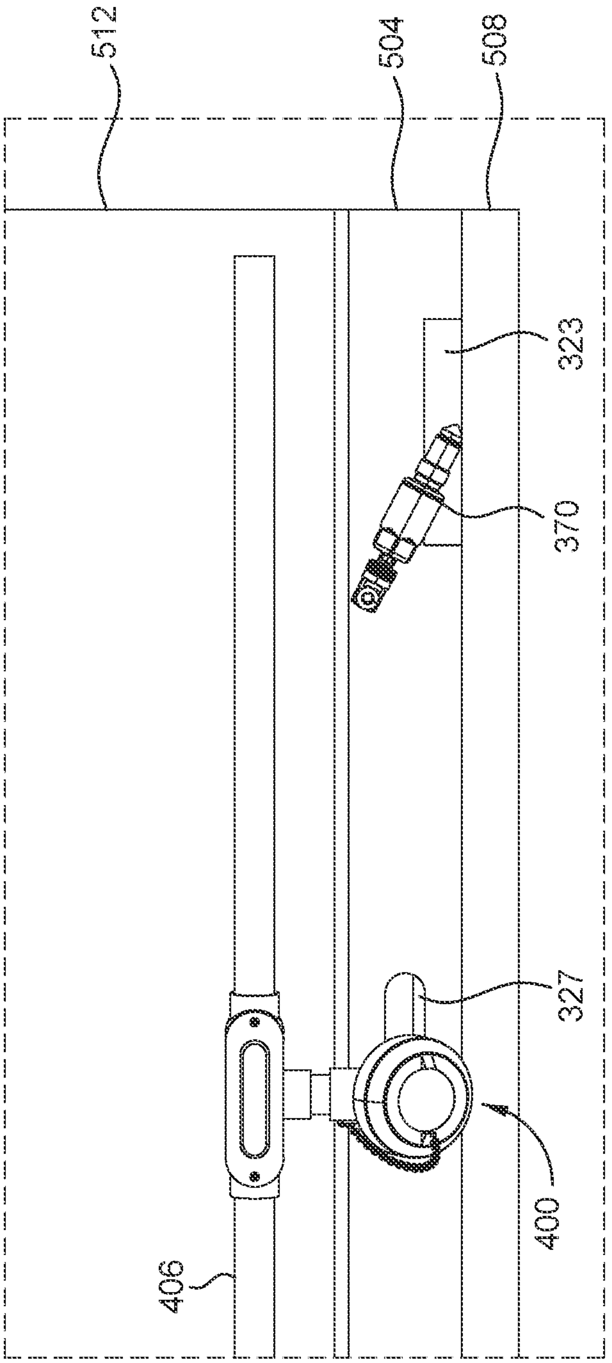
FIG. 10 is a partial sectional front view of a lower interior portion of the sidewall of FIG. 8.

FIG. 8 illustrates another embodiment of the sidewall 500 suitable for use with the furnace 100 in place of the sidewall 110. FIG. 9 is an enlarged, partial view of the sidewall 500. FIG. 10 is an enlarged, partial front view of the sidewall 500. FIGS. 9 and 10 only show a lower portion of the outer wall 512 for clarity. The sidewall 500 includes an upper wall 502, an inner wall 504, a bottom wall 508, and an outer wall 512. A drain trough 340 is formed between the inner wall 504 and the outer wall 512 and encloses an internal space 204. In this embodiment, the inner wall 504 of the sidewall 500 is substantially cylindrical, having a substantially linear (i.e., straight) vertical profile between the upper wall 502 and the bottom wall 508, as opposed to having a sloped section, such as the sloped wall 380 of the inner wall 304 shown in FIG. 3. As with the sidewall 110, the inner wall 504 has an inner surface 503 (e.g., cool face) that faces the internal space 204. The inner wall 504 also has an outer surface 505 (e.g., hot face) that is opposite the inner surface 503 and faces the interior of the furnace. As such, the outer surface 505 of the inner wall 504 faces the opening 101. As previously noted, the centerline 201 is the center of the opening 101.

The spray cooling assembly 208 is disposed in the internal space 204. The spray cooling assembly 208 includes the header pipe 324, a plurality of branch conduits 328 coupled to the header pipe 324, and an array of spray nozzles 332 coupled to the branch conduits 328. The nozzles 332 are arranged to spray cooling fluid 336 onto the inner surface 503 of the inner wall 504. Cooling fluid sprayed on the inner surface 503 runs down the inner surface 503 to the drain trough 340 disposed above the bottom wall 508. The drain trough 340 is attached to the inner wall 504 via flange 519, which spaces the trough 340 away from the inner wall 504. The drain trough 340 includes a trough bottom 307 connecting a trough wall 317 to the outer wall 512. A portion of the outer wall 512 forms part of the drain trough 340. A gap 548 is formed below the flange 519 and between the trough 340 and the inner wall 504.

The bottom wall 508 includes a bottom extension wall 550 extending radially inward beyond the inner wall 504 towards the refractory bricks 108. As shown in FIGS. 8 and 9, the bottom extension wall 550 is integral with the bottom wall 508. In another embodiment, the bottom extension wall 550 may be attached to the bottom wall 508 or the inner wall 504.

A liner wall 560 is attached to the distal end of the bottom extension wall 550 and extends upward from the bottom extension wall 550 away from the hearth 106. In one example, the refractory bricks 108 are positioned vertically along the furnace facing side of the liner wall 560. In some examples, the liner wall 560 is flush with the backside of the refractory bricks 108 that line the hearth 106. In one example, the liner wall 560 has a height from 6 inches to 20 inches, such as from 10 inches to 18 inches. The refractory bricks 108 may extend from the hearth 106 to the top of the liner wall 560.

In some embodiments, the liner wall 560 includes a cover wall 565 that extends radially inward away from the inner wall 504, covering at least a portion of the top surface 558 of the refractory bricks 108. As shown, the cover wall 565 covers a portion of the top surface 558 of the refractory bricks 108. In some examples, the cover wall 565 may extend across the entire top surface 558 of the refractory bricks 108. The liner wall 560 advantageously acts as a barrier that spaces the refractory bricks 108 from the other portions of the sidewall 500, such as the inner wall 504, thus helping to reduce the heat load transferred from the refractory bricks 108 to the sidewall 500. In some embodiments, the liner wall 560 and the cover wall 565 are made of steel. A leak containment feature such as a catch basin 562 is formed between the liner wall 560 and the inner wall 504. The catch basin 562 retains water that may be flowing down the furnace side of the inner wall 504 should the inner wall 504 become compromised.

Referring to FIG. 10, a plurality of apertures 323 are formed through the bottom of the inner wall 504. FIG. 10 is an enlarged, partial front view of the sidewall 500 and a lower portion of the outer wall 512 for clarity. The apertures 323 may be bounded in part by the bottom wall 508. The plurality of apertures 323 are behind and covered by the liner wall 560, and open to the catch basin 562. The apertures 323 provide a flow path for leaked water that may be present in the catch basin 562 defined between the inner wall 504 and the liner wall 560 to flow under the drain trough 340 and safely away from the interior of the furnace. The plurality of apertures 323 may be circumferentially spaced around the inner wall 504. The apertures 323 may have any suitable shape, such as rectangular or arcuate. In this example, the apertures 323 are slots. The apertures 323 may have any suitable size. In some examples, the ratio of the width to the height may range from 15:1 to 1:5, such as from 10:1. In some examples, the apertures 323 may have a width from 2 inches to 10 inches. The inner wall 504 may include any suitable number of apertures 323, such as from 1 to 50 apertures.

In some embodiments, one or more moisture sensors 370 are used to monitor the moisture on the bottom wall 308, 508 and/or the bottom extension wall 350, 550 of the sidewalls 110, 500 of FIGS. 3 and 8. In this example, the moisture sensors 370 are positioned below the drain trough 340 of the sidewall 110, 500 and adjacent an aperture 323 of the inner wall 304, 504. When moisture is detected, the proximate location of the leak (such as a breach in the inner wall 304, 504) may be determined, thus making maintenance more quick and effective. Alternatively or in addition to, the moisture sensors 370 may be positioned inside the catch basin 362, 562 between the inner wall 304, 504 and the liner wall 360, 560. Any suitable of number of moisture sensors 370 may be used, such as from 1 to 50 apertures. In some examples, a ratio of the number of moisture sensors 370 to the number of apertures 323 may be from 1:1 to 1:10. For example, a moisture sensor 370 may be provided adjacent every other aperture 323 or every third aperture 323. The moisture sensors 370 may be any suitable type of sensor operable to detect the presence of moisture or fluid on the bottom wall 308, 508 and/or the bottom extension wall 350, 550. An exemplary moisture sensor 370 is a water sensing wire. In one example, the moisture sensor 370 is a humidity sensor.

In one embodiment, the sidewall 110, 500 includes one or more sensors 400 for monitoring at least one of the temperature and the moisture behind the refractory bricks 108, as seen FIGS. 4-6 and 9. In one example, a tubular conduit 405 is disposed through a lower portion of the sidewall 110, 500 between the bottom of the trough 340 and the bottom wall 308, 508. As shown, the inner wall 304, 504 includes an opening 327 to accommodate passage of the conduit 405. In this example, the opening 327 is sized larger than the outer diameter of the conduit 405, thereby forming a clearance therebetween. In this respect, the opening 327 advantageously allows the conduit 405 to move relative to the inner wall 304, 504 to compensate for temperature gradients and thermal cycling. As shown, the opening 327 is a slot that allows conduit 405 to move laterally, i.e., in the x-direction 195, relative to the inner wall 304, 504. It is contemplated the opening 327 may be sufficiently sized to allow the conduit 405 to move laterally, vertically, or both, relative to the inner wall 304, 504.

Figure 7:
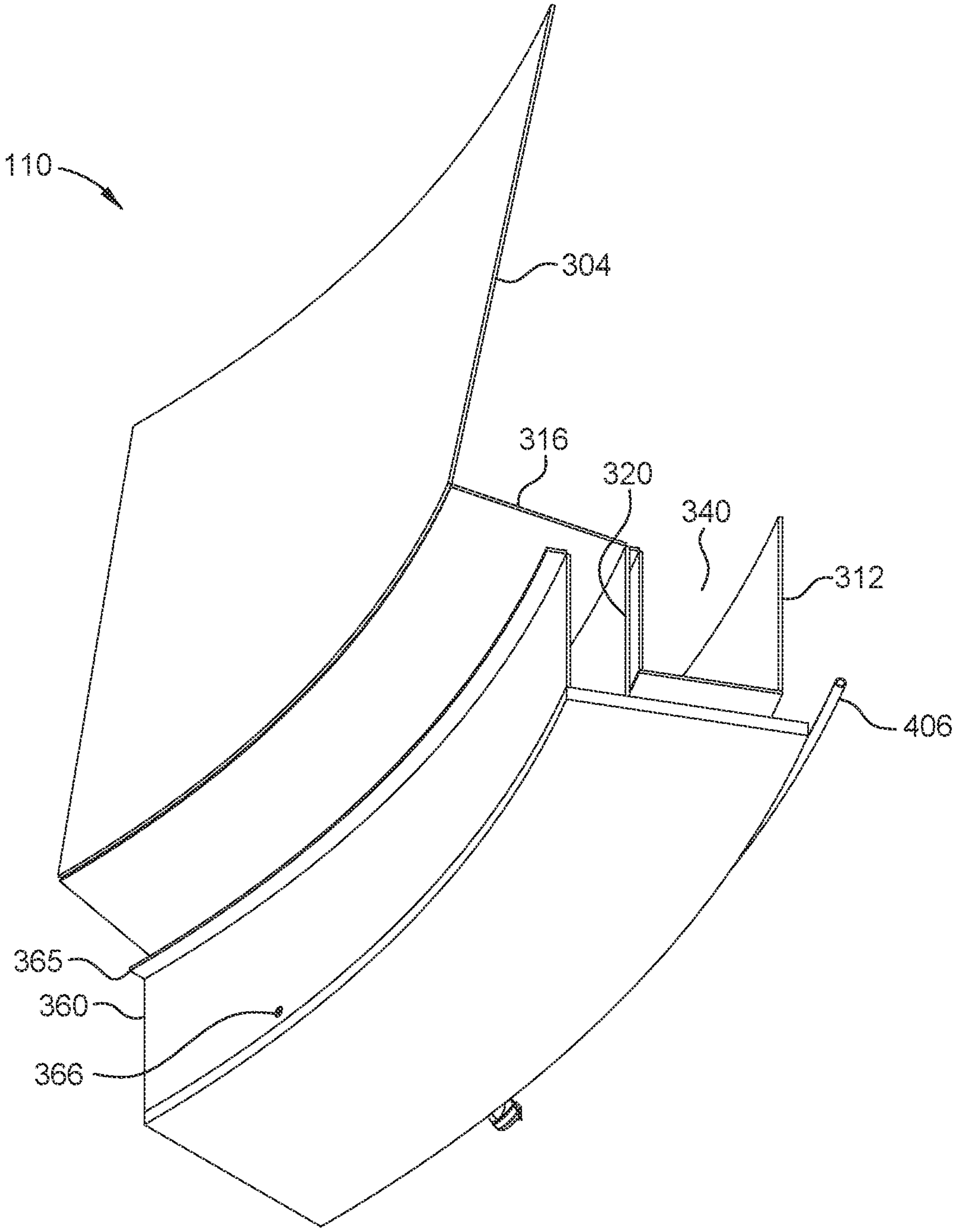
FIG. 7 is a partial sectional isometric, left bottom view of the lower interior portion of the sidewall of FIG. 3.

The inner end of the conduit 405 is attached to the liner wall 360, 560 and is in fluid communication with an opening 366 in the liner wall 360, 560. In one example, the conduit 405 is welded to the liner wall 360, 560. The opening 366 is also shown in FIG. 7, which is an isometric, left bottom view of the sidewall 110. The exterior end of the conduit 405 is below the drain trough 340 and may extend past the outer wall 312, 512. In some embodiments, a plurality of conduits 405 are circumferentially disposed around the sidewall 110, 500. The plurality of conduits 405 may be attached to a tubular connector 406 disposed around the sidewall 110, 500. The tubular connector 406 may house wires for transmitting information from the sensors 400 to a controller 450 for operating the furnace 100.

In one example, the sensor 400 is disposed through the conduit 405 and the opening 366 of the liner wall 360, 560. In this respect, the sensor 400 may measure the temperature and/or the humidity at the back of the refractory bricks 108 disposed in front of the sidewall 110, 500 above the hearth 106. Although a sensor 400 is disclosed, it is contemplated that the sensor 400 may be any suitable humidity and/or temperature sensor or may be a combination of a temperature sensor and a humidity sensor. In one example, the sensor 400 may be any suitable type of sensor operable to detect the presence of moisture or fluid at the back of the refractory bricks 108. An exemplary sensor 400 is a humidity and temperature sensor. The sensed temperature and/or humidity information from the sensor 400 may be transmitted to a controller 450 via the conduit 405 and the tubular connector 406. The sensed information is indicative of the service life of the refractory bricks 108, condition of the refractory bricks 108, water within the furnace 100, and leaks in the roof 120, among others. In some embodiments, the sensor 400 is a video device such as a camera or charged-coupled device for monitoring the refractory bricks 108. In one example, the video device may provide an image representative of the surface condition of the refractory bricks 108.

In some embodiments, the controller 450 is configured to take action in response to the information received from one or more of the sensor 400 and the moisture sensor 370. The information may be compared to a predefined criteria or value, or analyzed for trends (e.g., rate of change). The predefined criteria, value, or trend information may be retrieved from memory or an outside electronic device, or manually inputted. In one example, the water detected by the moisture sensor 370 may trigger the controller 450 to send a water leak warning to the operator. The warning may be in the form of an audible alarm, a warning light, or an electronic communication, such as an email, text message, or electronic notification/information sent to a remote electronic device. In some embodiments, controller 450 may provide the location of the water leak by identifying the unique one of moisture sensors 370 that detected the water leak. Since each unique moisture sensor 370 is positioned at a known location within the sidewall 110, 500, the location of sidewall damage may be included as part of the warning. In some embodiments, the controller 450 may halt some or all of the operations of the furnace 100 in response to any warnings triggered by the moisture sensor 370, such as turning off power to the electrodes, turning burners, or other action.

In another example, moisture detected by the sensor 400 may trigger the controller 450 to send a warning to the operator if moisture and/or temperature exceeds a predetermined threshold and/or has a rate of change that exceeds a predetermined threshold. The warning may be in the form of an audible alarm, a warning light, or an electronic communication, such as an email, text message, or electronic notification/information sent to a remote electronic device. In some embodiments, controller 450 may provide the location of the sensor 400 that triggered the warning, which is indicative of the region of the furnace 100 that requires maintenance. The warning, generated based on the sensed information obtained from the sensor 400, may be indicative of the service life of the refractory bricks 108, condition of the refractory bricks 108, water within the furnace 100, and leaks in the roof 120, among others In another example, the controller 450 may compare the temperature measured by the sensor 400 to a predetermined threshold temperature. When the measured temperature at the backside of the refractory bricks 108 is above the threshold temperature, the controller 450 may send a high temperature warning to the operator. In some embodiments, the controller 450 may provide the location of the detected high temperature by identifying the sensor 400 that detected the high temperature. In some examples, the predetermined threshold temperature is in a range from 200° F. to 1,000° F.

In another example, the sensor 400 is configured to measure relative humidity. The controller 450 may compare the measured relative humidity to a predetermined threshold relative humidity. When the measured relative humidity at the backside of the refractory bricks 108 is above the threshold relative humidity, the controller 450 may send a high relative humidity warning to the operator. In some embodiments, the controller 450 may provide the location of the detected high relative humidity by identifying the sensor 400 that detected the high relative humidity. In some examples, the predetermined threshold relative humidity is in a range from 0% to 100%.

When the temperature at the backside of the refractory bricks 108 is below the threshold temperature, the controller 450 may keep track of the measured temperature to monitor temperature trends that are indicative of the condition and remaining life of the refractory bricks 108. A high temperature measurement (e.g., above the threshold temperature) or an increasing temperature trend may be indicative of wear or failure of the refractory bricks 108. In some examples, the controller 450 may monitor for temperature increases over time. For example, the controller 450 may be configured to identify an undesirable temperature increase of over 20° F. within a 24 hour period. The temperature increase may occur gradually over time or occur as a temperature spike. In another example, the temperature increase may be compared to a historical temperature pattern of the furnace 100 or to temperature patterns from other furnaces stored in the controller 450. The controller 450 may be configured to identify temperature pattern changes that is more than 5% to 15% over the base temperature pattern. In response to a detected undesirable temperature change, the controller 450 may send an undesirable temperature change warning to the operator. In some embodiments, the controller 450 may provide the location of the undesirable temperature change by identifying sensor 400 that detected the high temperature. In some embodiments, the controller 450 may halt the operation of the furnace 100 in response to any warnings triggered by the sensor 400. In some embodiments, trend information may be used to schedule or predict preventative maintenance, such as replacing the bricks 108, replacing the sidewall 110, 500, or other suitable maintenance.

Figure 11:
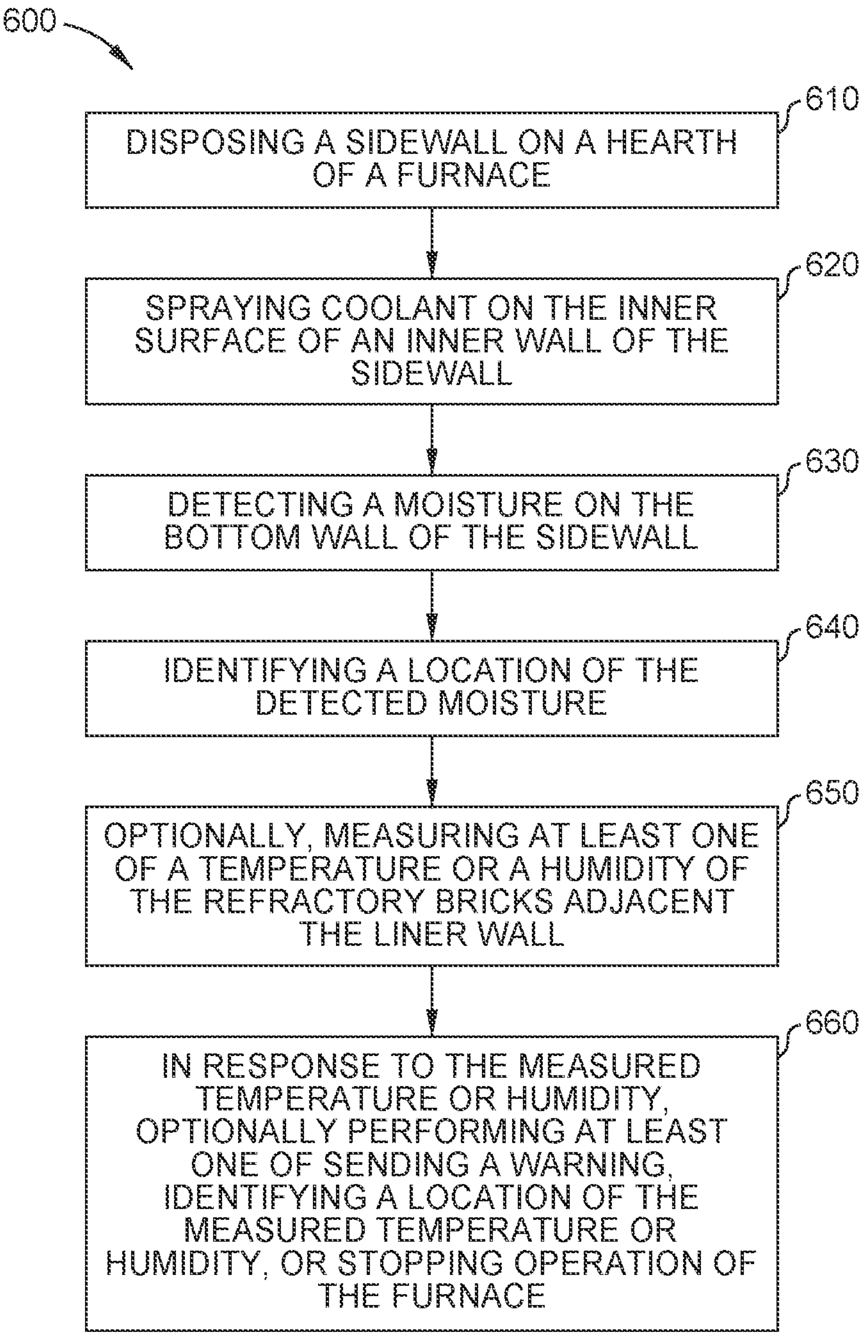
FIG. 11 is an exemplary flow diagram of a method for operating a furnace.

FIG. 11 illustrates an exemplary flow diagram of a method 600 for operating a furnace. The method begins at operation 610 by disposing a sidewall, such as sidewall 500, on a hearth 106. The method disclosed herein is also applicable to sidewall 110. The hearth 106 may be lined with a plurality of refractory bricks 108. The sidewall 500 may be constructed as disclosed above and includes an outer wall 512 and an inner wall 504 coupled to an upper wall 502 and extending downwardly from the upper wall 502. The inner wall 504 includes an inner face 503 and is circumscribed by the outer wall 512. A bottom wall 508 is coupled to the inner wall 504. The bottom wall 508 having a bottom extension wall 550 extending away from the inner wall 504. A liner wall 560 is attached to the bottom extension wall 550 and extending upward in a spaced apart relationship to the inner wall 504. The liner wall 560 is disposed along a portion a plurality of refractory bricks 108 lining the hearth 106.

At operation 620, during operation of the furnace, the cooling system 208 sprays cooling fluid 336 on the inner surface of the inner wall 504 to control the temperature of sidewall 500.

At operation 630, the bottom wall 508 of the sidewall 500 is monitored to detect for moisture. Moisture sensors 370 are positioned below the drain trough 340 between the outer wall 512 and the inner wall 504. The moisture sensors 370 can detect moisture through apertures 323 formed in the inner wall 504. In some examples, the moisture sensors 370 may be positioned in the catch basin 562 formed between the inner wall 504 and the liner wall 560.

At operation 640, when moisture is detected, the moisture sensor 370 may send a signal to a controller 450 indicating moisture has been detected. In response, the controller 450 may identify the location of the detected moisture based on the moisture sensor 370 that sent the signal.

At operation 650, the method optionally includes measuring at least one of a temperature or a humidity of the refractory bricks 108 adjacent the liner wall 560 or monitoring images of the refractory bricks 108. Sensors 400 are disposed through a conduit 405 and an opening 366 of the liner wall 560 to measure the temperature and/or the humidity of the refractory bricks 108 and/or capture images of the refractory bricks 108 in front of the sidewall 500 above the hearth 106. The measured temperature, measured humidity and/or captured images are sent to the controller 450.

At operation 660, in response to the measured temperature or humidity or captured image, the controller 450 optionally performs at least one of sending a warning, identifying a location of the measured temperature or humidity or captured image, and stopping operation of the furnace. In one example, the controller 450 can send a warning to the operator if the measured moisture or temperature exceeds a predetermined threshold and/or has a rate of change that exceeds a predetermined threshold. In another example, the controller 450 can send a warning to the operator if differences between the captured image(s) and a prior image are identified. The warning may be in the form of an audible alarm, a warning light, or an electronic communication, such as an email, text message, or electronic notification/information sent to a remote electronic device. In another example, the controller 450 may provide the location of the sensor 400 that triggered the warning, which is indicative of the region of the furnace 100 that requires maintenance. In some examples, the controller 450 may halt some or the entire operation of the furnace 100 in response to any warnings triggered by the sensor 400. In some embodiments, the controller 450 can identify trends based on the measured temperature or humidity or captured image. Trend information may be used to schedule or predict preventative maintenance, such as replacing the bricks 108, replacing the sidewall 110, 500, or other suitable maintenance. It is contemplated that operations 650 and 660 may be performed simultaneously with, before, or after operations 630 and 640.

Examples disclosed herein relate to sidewall for use in a metallurgical furnace and a metallurgical furnace having the same. Beneficially, the sidewall of the metallurgical furnace includes a liner wall behind the refractory bricks to reduce the heat load transfer to the sidewall. The liner wall also help define a catch basin configured to capture water leaked from the sidewall, thus preventing leaked water from reaching the refractory bricks and comprising the refractory bricks. The catch basin also prevents water from reaching the molten material disposed in the hearth and becoming a hazard. Water in the catch basin may drain through a plurality of apertures formed through an inner wall of the sidewall and flow under the drain trough where the water can be safely removed. In some examples, one or more moisture sensors are positioned adjacent the apertures to detect water leak through the inner wall. Humidity and temperature sensors are provided to monitor temperature and humidity of the refractory bricks. The humidity and temperature information may be utilized to improve preventative maintenance scheduling and to flag potential furnace conditions that require an operator's attention.

The controller 450 disclosed herein includes a central processing unit (CPU) 453, a memory 454, and support circuits 455. The controller 450 is configured to take action in response to measured information received from the sensors 370, 400, including sending warning, providing location information of the sensor, and stopping some or all operations of the furnace. The CPU 453 is a general purpose computer processor configured for use in an industrial setting for monitoring and controlling a furnace and operations related thereto. The memory 454 described herein may include random access memory, read only memory, floppy or hard disk drive, or other suitable forms of digital storage, local or remote. The support circuits 455 are conventionally coupled to the CPU 453 and comprise cache, clock circuits, input/output subsystems, power supplies, and the like, and combinations thereof. Software instructions (program) and data can be coded and stored within the memory 454 for instructing a processor within the CPU 453. A software program (or computer instructions) readable by CPU 453 in the controller 450 determines which action is to be taken in response to information received from the sensors 370, 400. Preferably, the program, which is readable by CPU 453 in the controller 450, includes code, which when executed by the processor (CPU 453), takes action relating to monitoring and operating the furnace described herein. The program will include instructions that are used to control the various hardware and electrical components within the furnace to perform the various tasks used to implement the monitoring, warning, and operational schemes described herein.

Described herein is a sidewall suitable for use in a metallurgical furnace, and metallurgical furnace having the same. In one example, the sidewall has an upper wall, and an outer wall is coupled to the upper wall and extends downward from the upper wall. An inner wall is coupled to the upper wall and extends downward from the upper wall. The inner wall has an inner surface facing and circumscribed by the outer wall. A bottom wall is coupled to the inner wall. The bottom wall has a bottom extension wall extending away from the inner wall. A liner wall is attached to the bottom extension wall and extends upward in a spaced apart relationship to the inner wall. A spray cooling assembly is disposed between the inner wall and the outer wall. The spray cooling assembly is configured to spray coolant on the inner surface of the inner wall.

In another example, a metallurgical furnace is provided. The metallurgical furnace includes a hearth and a plurality of refractory bricks lining a portion of the hearth. A sidewall is disposed on the hearth. The sidewall has an upper wall, and an outer wall is coupled to the upper wall and extends downward from the upper wall. An inner wall is coupled to the upper wall and extends downward from the upper wall. The inner wall has an inner surface facing and circumscribed by the outer wall. A bottom wall is coupled to the inner wall. The bottom wall has a bottom extension wall extending away from the inner wall. A liner wall is attached to the bottom extension wall and extends upward in a spaced apart relationship to the inner wall. A spray cooling assembly is disposed between the inner wall and the outer wall. The spray cooling assembly is configured to spray coolant on the inner surface of the inner wall.

In some examples, a cover wall is attached to an upper portion of the liner wall, and the cover wall is at partially disposed on a top surface of the plurality of refractory bricks.

In some examples, the bottom extension wall is attached to the bottom wall or the inner wall.

In some examples, a tubular conduit extends through the inner wall and attaches to the liner wall.

In some examples, the tubular conduit is in fluid communication with an opening formed in the liner wall.

In some examples, a sensor is configured to detect humidity and/or temperature through the opening disposed at an end of the tubular conduit.

In some examples, the inner wall includes a plurality of apertures formed at a bottom end of the inner wall behind the liner wall.

In some examples, a moisture sensor is disposed adjacent an aperture of the plurality of apertures and between the inner wall and the outer wall.

In some examples, a moisture sensor is disposed adjacent an aperture of the plurality of apertures and between the inner wall and the liner wall.

In some examples, a video device is used to monitor the refractory bricks.

While the foregoing is directed to specific examples, other examples may be devised without departing from the basic scope thereof, and the scope thereof is determined by the claims that follow.

What is claimed is:

1. A sidewall for a metallurgical furnace, the sidewall comprising:

an upper wall;

an outer wall coupled to the upper wall and extending downward from the upper wall;

an inner wall coupled to the upper wall, the inner wall extending downward from the upper wall, the inner wall having an inner surface facing and circumscribed by the outer wall;

a bottom wall coupled to the inner wall, the bottom wall having a bottom extension wall that is integral with the bottom wall, the bottom wall extending away from the inner wall; and a liner wall attached to the bottom extension wall and extending upward in a spaced apart relationship to the inner wall; and a spray cooling assembly disposed between the inner wall and the outer wall, the spray cooling assembly configured to spray coolant on the inner surface of the inner wall.

2. The sidewall of claim 1, further comprising a cover wall attached to an upper portion of the liner wall, the cover wall extending away from the liner wall.

3. The sidewall of claim 1, wherein the bottom extension wall is attached to the bottom wall or the inner wall.

4. The sidewall of claim 1, wherein the inner wall is substantially straight between the upper wall and the bottom wall.

5. The sidewall of claim 1, further comprising a tubular conduit extending through the inner wall and attached to the liner wall.

6. The sidewall of claim 5, wherein the tubular conduit is in fluid communication with an opening formed in the liner wall.

7. The sidewall of claim 6, further comprising a sensor configured to detect humidity and/or temperature through the opening disposed at an end of the tubular conduit.

8. The sidewall of the claim 7, wherein the sidewall further comprises a trough positioned to receive coolant sprayed on the inner surface of the inner wall, and the tubular conduit passing below the trough.

9. The sidewall of claim 1, wherein the inner wall includes a plurality of apertures formed at a bottom end of the inner wall behind the liner wall.

10. The sidewall of claim 9, further comprising a moisture sensor disposed adjacent an aperture of the plurality of apertures and between the inner wall and the outer wall or between the inner wall and the liner wall.

11. The sidewall of claim 1, wherein the inner wall is a sloped wall, and the sidewall further comprises:

- a return wall extending from the sloped wall toward the outer wall;
- a drainage trough; and
- a lower wall coupled to the return wall and spaced from the drainage trough, wherein the return wall extends beyond the lower wall to the drainage trough.

12. A metallurgical furnace, comprising:

- a hearth;
- a plurality of refractory bricks lining a portion of the hearth; and
- a sidewall disposed on the hearth, the sidewall comprising:
  - an upper wall;
  - an outer wall coupled to the upper wall and extending downward from the upper wall;
  - an inner wall coupled to the upper wall, the inner wall extending downward from the upper wall, the inner wall having an inner surface facing and circumscribed by the outer wall;
  - a bottom wall coupled to the inner wall, the bottom wall having a bottom extension wall that is integral with the bottom wall, the bottom wall extending away from the inner wall; and
  - a liner wall attached to the bottom extension wall and extending upward in a spaced apart relationship to the inner wall, the liner wall disposed along a portion the plurality of refractory bricks; and
  - a spray cooling assembly disposed between the inner wall and the outer wall, the spray cooling assembly configured to spray coolant on the inner surface of the inner wall.

13. The metallurgical furnace of claim 12, further comprising a cover wall attached to an upper portion of the liner wall, the cover wall at partially disposed on a top surface of the plurality of refractory bricks.

14. The metallurgical furnace of claim 13, wherein the inner wall includes a plurality of apertures formed at a bottom end of the inner wall behind the liner wall.

15. The metallurgical furnace of claim 12, wherein the bottom extension wall is attached to the bottom wall or the inner wall.

16. The metallurgical furnace of claim 12, further comprising a tubular conduit extending through the inner wall and attached to the liner wall and in fluid communication with an opening formed in the liner wall.

17. A method for monitoring operation of a metallurgical furnace, the method comprising:

- disposing a sidewall on a hearth of the furnace, the sidewall including:
  - an upper wall;
  - an outer wall coupled to the upper wall and extending downward from the upper wall;
  - an inner wall coupled to the upper wall, the inner wall extending downward from the upper wall, the inner wall having an inner surface facing and circumscribed by the outer wall;
  - a bottom wall coupled to the inner wall, the bottom wall having a bottom extension wall extending away from the inner wall; and
  - a liner wall attached to the bottom extension wall and extending upward in a spaced apart relationship to the inner wall, the liner wall disposed along a portion a plurality of refractory bricks lining the hearth;
- spraying coolant on the inner surface of the inner wall;
- detecting a moisture on the bottom wall of the sidewall; and
- identifying a location of the detected moisture.

18. The method of claim 17, wherein detecting the moisture comprises using a sensor disposed adjacent to an aperture formed at a bottom end of the inner wall behind the liner wall.

19. The method of claim 18, wherein identifying the location comprises identifying a location of the sensor.

20. The method of claim 17, further comprising:

- measuring at least one of a temperature or a humidity of the portion of the refractory bricks adjacent the liner wall; and
- in response to the measured temperature or humidity, performing at least one of sending a warning, identifying a location of the measured temperature or humidity, or stopping operation of the furnace.

* * * * *